(12) United States Patent
Chang et al.

(10) Patent No.: US 7,089,349 B2
(45) Date of Patent: Aug. 8, 2006

(54) INTERNAL MAINTENANCE SCHEDULE REQUEST FOR NON-VOLATILE MEMORY SYSTEM

(75) Inventors: Robert C. Chang, Danville, CA (US); Bahman Qawami, San Jose, CA (US); Farshid Sabet-Sharghi, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 382 days.

(21) Appl. No.: 10/696,229

(22) Filed: Oct. 28, 2003

(65) Prior Publication Data

US 2005/0091445 A1 Apr. 28, 2005

(51) Int. Cl.
*G06F 12/00* (2006.01)

(52) U.S. Cl. .................................. 711/103
(58) Field of Classification Search ............ 711/103, 711/156; 365/185.29, 185.3, 185.33
See application file for complete search history.

(56) References Cited

U.S. PATENT DOCUMENTS

| 5,222,109 | A | 6/1993 | Pricer ..................... 377/24.1 |
|---|---|---|---|
| 5,297,148 | A | 3/1994 | Harari et al. ............ 371/10.2 |
| 5,388,083 | A | 2/1995 | Assar et al. ............... 365/218 |
| 5,438,573 | A | 8/1995 | Mangan et al. .......... 371/10.3 |
| 5,568,439 | A | 10/1996 | Harari ...................... 365/218 |
| 5,598,370 | A | 1/1997 | Niijima et al. ........ 365/185.33 |
| 5,835,935 | A | 11/1998 | Estakhri et al. ............ 711/103 |
| 5,845,313 | A | 12/1998 | Estakhri et al. ............ 711/103 |
| 5,860,082 | A | 1/1999 | Smith et al. ............... 711/103 |
| 5,907,856 | A | 5/1999 | Estakhri et al. ............ 711/103 |
| 5,924,113 | A | 7/1999 | Estakhri et al. ............ 711/103 |
| 6,016,275 | A | 1/2000 | Han ..................... 365/185.29 |
| 6,081,447 | A | 6/2000 | Lofgren et al. ........ 365/185.02 |
| 6,115,785 | A | 9/2000 | Estakhri et al. ............ 711/103 |
| 6,125,435 | A | 9/2000 | Estakhri et al. ............ 711/201 |
| 6,230,233 | B1 | 5/2001 | Lofgren et al. ............ 711/103 |
| 6,260,156 | B1 | 7/2001 | Garvin et al. ................ 714/8 |
| 6,426,893 | B1 | 7/2002 | Conley et al. ......... 365/185.11 |
| 2001/0023472 | A1* | 9/2001 | Kubushiro et al. ........ 711/103 |
| 2005/0174849 | A1* | 8/2005 | In et al. ................ 365/185.11 |
| 2005/0281088 | A1* | 12/2005 | Ishidoshiro et al. ... 365/185.29 |

FOREIGN PATENT DOCUMENTS

| JP | 62-283496 | 12/1987 |
|---|---|---|
| JP | 62-283497 | 12/1987 |

OTHER PUBLICATIONS

Kim, Jesung et al., "A Space-Efficient Flash Translation Layer for Compactflash Systems", IEEE Transactions on Consumer Electronics, vol. 48, No. 2, May 2002.

* cited by examiner

Primary Examiner—Kevin L. Ellis
(74) Attorney, Agent, or Firm—Anderson, Levine & Lintel

(57) ABSTRACT

Methods and apparatus for enabling updates to data structures to be scheduled are disclosed. According to one aspect of the present invention, a method for operating a memory system with a non-volatile memory that includes a plurality of physical blocks and a plurality of data structures including an erase count block involves determining when contents of at least one data structure is to be updated. A request to update the contents of the data structure is queued or scheduled when it is determined that the contents are to be updated, and the request is executed when it effectively reaches the top of the queue.

26 Claims, 10 Drawing Sheets

INTERNAL MAINTENANCE SCHEDULE REQUEST FOR NON-VOLATILE MEMORY SYSTEM

CROSS REFERENCE TO RELATED APPLICATIONS

The present invention is related to co-pending U.S. patent application Ser. Nos. 10/281,739, 10/281,823, 10/281,670, 10/281,824, 10/281,631, 10/281,855, 10/281,762, 10/281,696, 10/281,626, and 10/281,804, as well as co-pending U.S. Provisional Patent Application Nos. 60/421,910, 60/421,725, 60/421,965, 60/422,166, 60/421,746, and 60/421,911, each filed on Oct. 28, 2002, which are each incorporated herein by reference in their entireties. The present invention is also related to co-pending U.S. patent application Ser. Nos. 10/696,685 and 10/696,228, filed concurrently herewith, which are incorporated by reference in its entirety.

BACKGROUND OF THE INVENTION

1. Field of Invention

The present invention relates generally to mass digital data storage systems. More particularly, the present invention relates to systems and methods for efficiently enabling physical block usage information to be updated within a non-volatile memory system.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and controller components. Typically, a flash memory chip set may be arranged to be assembled into an embedded system. The manufacturers of such assemblies or host systems typically acquire flash memory in component-form, as well as other components, then assemble the flash memory and the other components into a host system.

When a memory system is powered down, the power down may either occur because a user has shut down the memory system, or because there has been a loss of power to the memory system. If a user chooses to power down the memory system, the memory system generally completes substantially all current processes, e.g., the memory system completes a process of writing a file from a host system into a directory associated with the memory system. In addition, information or data within the memory system may be stored in a current, up-to-date state. If a power down occurs because of an unexpected or abrupt loss of power due to a power failure, for example, then current processes are not completed and are instead typically aborted. Further, some information or data may be lost.

A memory system which has been powered down under "normal" circumstances, as for example in response to a user request to cut power to the memory system, generally does not require a disk scan or data recovery to be performed, as all processes which were occurring at the time a power down request was received have been completed. This is typically referred to as a "normal shutdown" or "normal power down." However, a memory system which has been powered down under "abnormal" circumstances, e.g., due to a power failure, battery failure or accident power removal, typically requires a disk scan and a data recovery to be performed, as will be appreciated by those skilled in the art. The power down under abnormal circumstances is typically referred to as an "abnormal shutdown" or an "abnormal power down."

When an abnormal shutdown occurs, information stored in a memory system may be lost. By way of example, when erase counts stored in an erase count block as described in co-pending U.S. patent application Ser. No. 10/281,626, which has been incorporated by reference, have not been updated for a relatively long time before an abnormal shut down occurs, current erase counts may not be reflected in the erase count block. In some instances, the erase count stored in an erase count block for a particular physical block may have a significantly lower value than an actual erase count of the physical block. When an erase count stored in an erase count block has a value that is significantly lower than a corresponding actual erase count of a physical block, after an abnormal shutdown and a subsequent power up, the erase count of the physical block may effectively be reset to the stored erase count. As a result, the physical block may have significantly more wear than indicated by the erase count stored within the physical block.

Therefore, what is desired is a process and a system which enables information stored in a memory system to be periodically updated. That is, what is needed is an efficient method for allowing data associated with a memory system to be relatively regularly updated such that when the memory system is shut down abnormally and then powered up, the data restored using a data recovery process at power up is fairly current.

SUMMARY OF THE INVENTION

The present invention relates to a system and a method for allowing updates to data structures to be scheduled. According to one aspect of the present invention, a method for operating a memory system with a non-volatile memory that includes a plurality of physical blocks and a plurality of data structures including an erase count block involves determining when contents of at least one data structure is to be updated. A request to update the contents of the data structure is queued or scheduled when it is determined that the contents are to be updated, and the request is executed when it effectively reaches the top of the queue. In one embodiment, updating the contents of the data structure includes updating the contents of the erase count block to indicate a substantially current status of each physical block.

When dynamic information such as status information relating to the wear on a physical block is not updated for a relatively long period of time and there is an abnormal power down, a subsequent data recovery process may result in the restoration of outdated information since substantially only the outdated information is restorable while current, accurate information may not be. To increase the likelihood that restored information is up-to-date, the internal maintenance procedures which allow information stored in data structures to be substantially periodically updated may be scheduled. Hence, if maintenance is scheduled, for example, once a day, then information stored in the data structure may effectively be assumed to be less than a day old.

According to another aspect of the present invention, a memory system includes a non-volatile memory which includes a plurality of physical blocks and a plurality of data structures including an erase count block that contains an erase count associated with a physical block that indicates a number of times the physical block has been erased. A method for operating the memory system includes determining when an internal maintenance process is to be performed. The internal maintenance process is arranged to update the erase count of the physical block in the erase count block. The method also includes queuing a request for the internal maintenance process when it is determined that the internal maintenance request is to be performed, as well as executing the internal maintenance process.

In one embodiment, executing the internal maintenance process includes updating the erase count of the physical block in the erase count block and updating a first data structure of the plurality of data structures. The first data structure, which may be a power management block, is arranged to contain information used when the memory system is powered up that includes the erase count of the physical block.

In another embodiment, determining when the internal maintenance process is to be performed includes comparing a first value with a threshold. In such an embodiment, when the first value is substantially equal to the threshold, it is determined that the internal maintenance process is to be performed. Alternatively, in another embodiment, determining when the internal maintenance process is to be performed may include obtaining a time associated with the memory system and determining when the time indicates that the internal maintenance process is to be performed.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation a memory device, e.g., memory device 120 of FIG. 1a.

DETAILED DESCRIPTION OF THE EMBODIMENTS

The loss of power to a memory system may generally cause a multitude of problems within the memory system. The problems include, but are not limited to, data being lost when power is lost during a process of writing a file to the flash memory. In order to correct problems which occur due to a power loss, recovery operations may be performed upon a subsequent power up of a memory system to maintain data integrity. When information which is recoverable, e.g., erase count information which provides a measure of how often physical blocks have been erased, is not up-to-date, recovered information may be inaccurate, and potentially cause problems within the memory system. For instance, a block may actually have more wear than indicated by a recovered erase count, which may be problematic if a block is near the end of its usable life but it is not known that the block is near the end of its usable life.

Although some dynamic, e.g., changing, information such as erase counts is typically updated during a normal power down process, if a memory system is not powered down for a relatively long period of time, such dynamic information may not be updated. If dynamic information is not updated for a relatively long period of time and there is an abnormal power down, a subsequent data recovery process may result in outdated information being restored. In order to increase the likelihood that restored information is up-to-date, the information may be substantially periodically updated. In one embodiment, internal maintenance which allows for some information to be updated may be scheduled periodically. Scheduled internal maintenance may also enable certain tables or blocks within the memory system to effectively be backed up, e.g., in system memory or a reserved section of non-volatile memory.

Figure 1A:
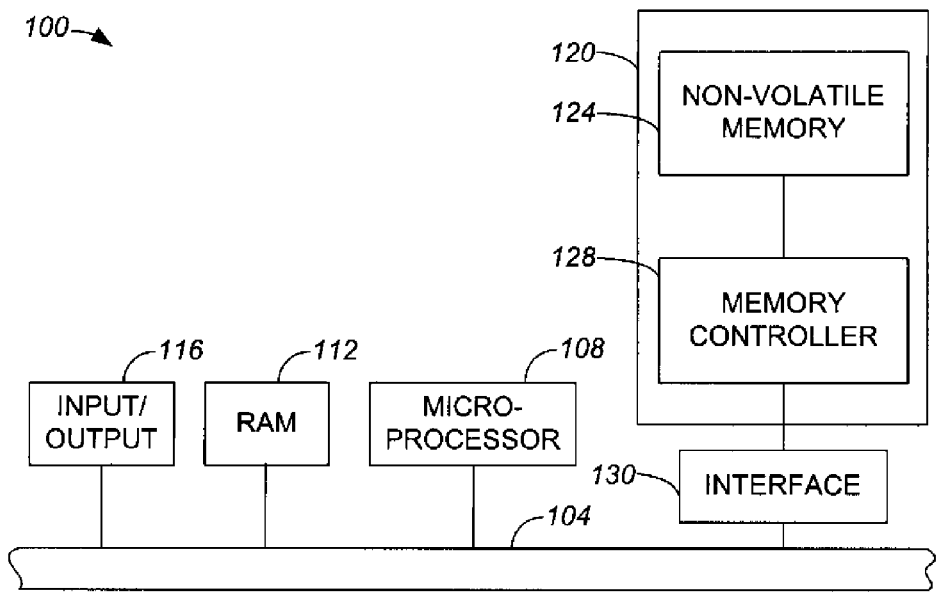
FIG. 1a is a diagrammatic representation of a general host system which includes a non-volatile memory.

Flash memory systems or, more generally, non-volatile memory devices which may benefit from the use of scheduled internal maintenance generally include flash memory cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 1c. Referring to FIG. 1a, a general host system which includes a non-volatile memory device, e.g., a Compact-Flash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 1b.

Non-volatile memory 124, e.g., flash memory such as NAND flash memory, is arranged to store data such that data may be accessed and read as needed. Data stored in non-volatile memory 124 may be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and secure digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 1B:
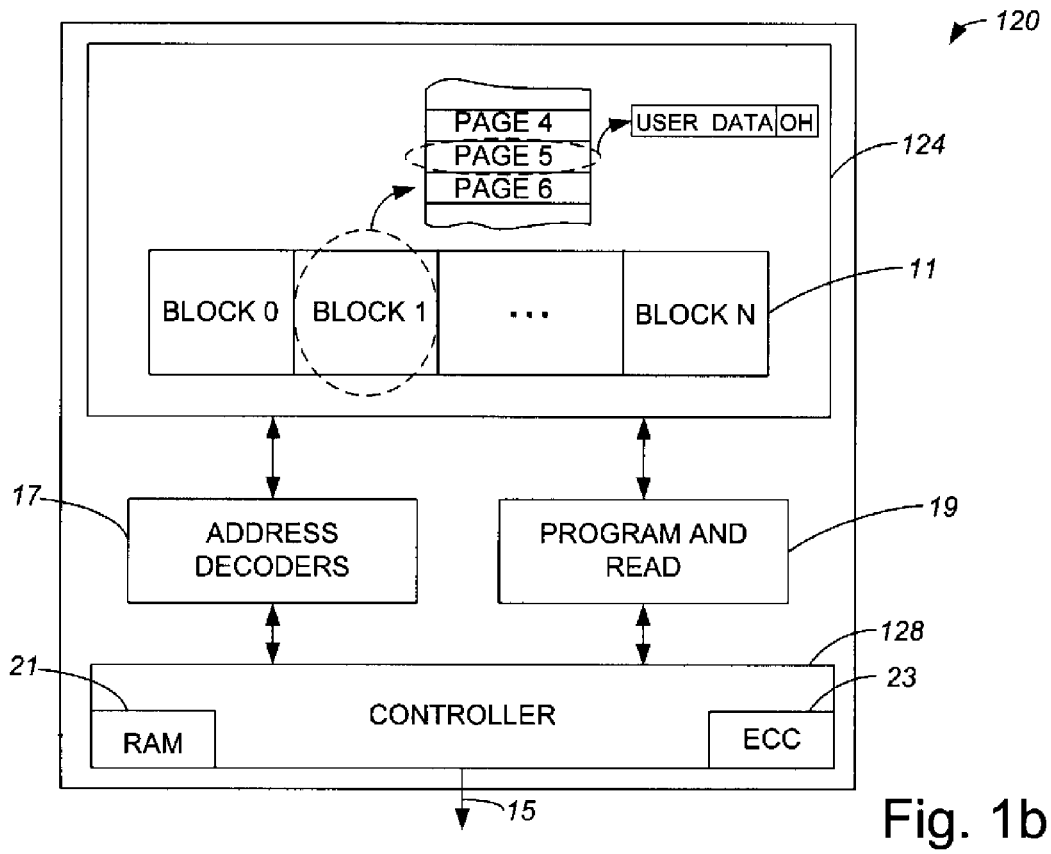

With reference to FIG. 1b, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 1a. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 apply the correct voltages to gate and bit lines of array 11 in order to program data to, read data from, or erase a group of memory cells being addressed by the control system 128. Additional circuits 19 include programming drivers that control voltages applied to elements of the array that depend upon the data being programmed into an addressed group of cells. Circuits 19 also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like.

Array 11 is divided into a large number of BLOCKS 0–N memory cells. As is common for flash EEPROM systems, the block is typically the smallest unit of erase. That is, each block contains the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 1b, one sector includes user data and overhead data. Overhead data typically includes an error correction code (ECC) that has been calculated from the user data of the sector. A portion 23 of the control system 128 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data, or redundant data, is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 1C:
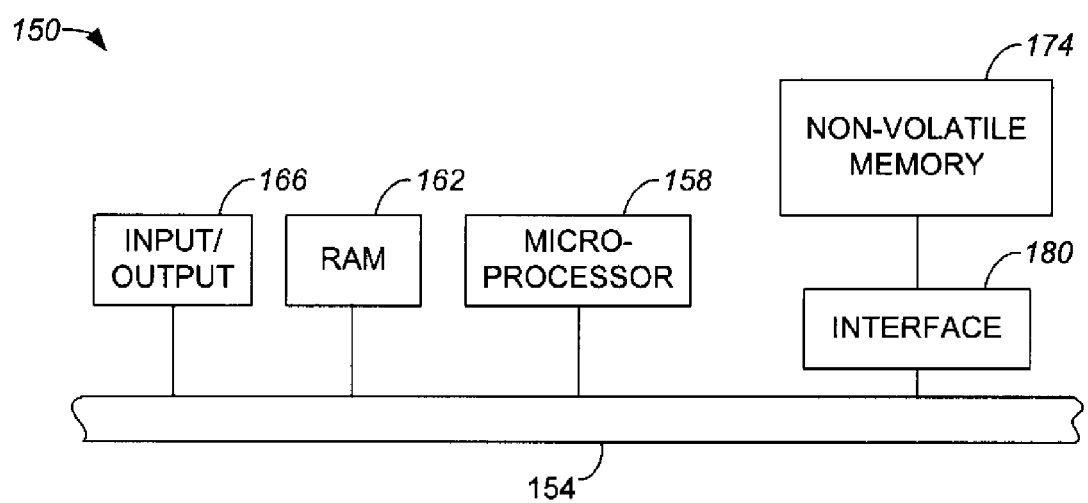
FIG. 1c is a diagrammatic representation of a host system which includes an embedded non-volatile memory.

In one embodiment, non-volatile memory is embedded into a system, e.g., a host system. FIG. 1c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices (not shown), i.e., software code devices or firmware code devices, which allow non-volatile memory 174 to be controlled. Such code devices, which may be a flash memory packaged with CPU inside microprocessor 158, a separate flash ROM, or inside non-volatile memory 174, which will be described below, may enable physical blocks in non-volatile memory 174 to be addressed, and may enable information to be stored into, read from, and erased from the physical blocks.

Figure 2:
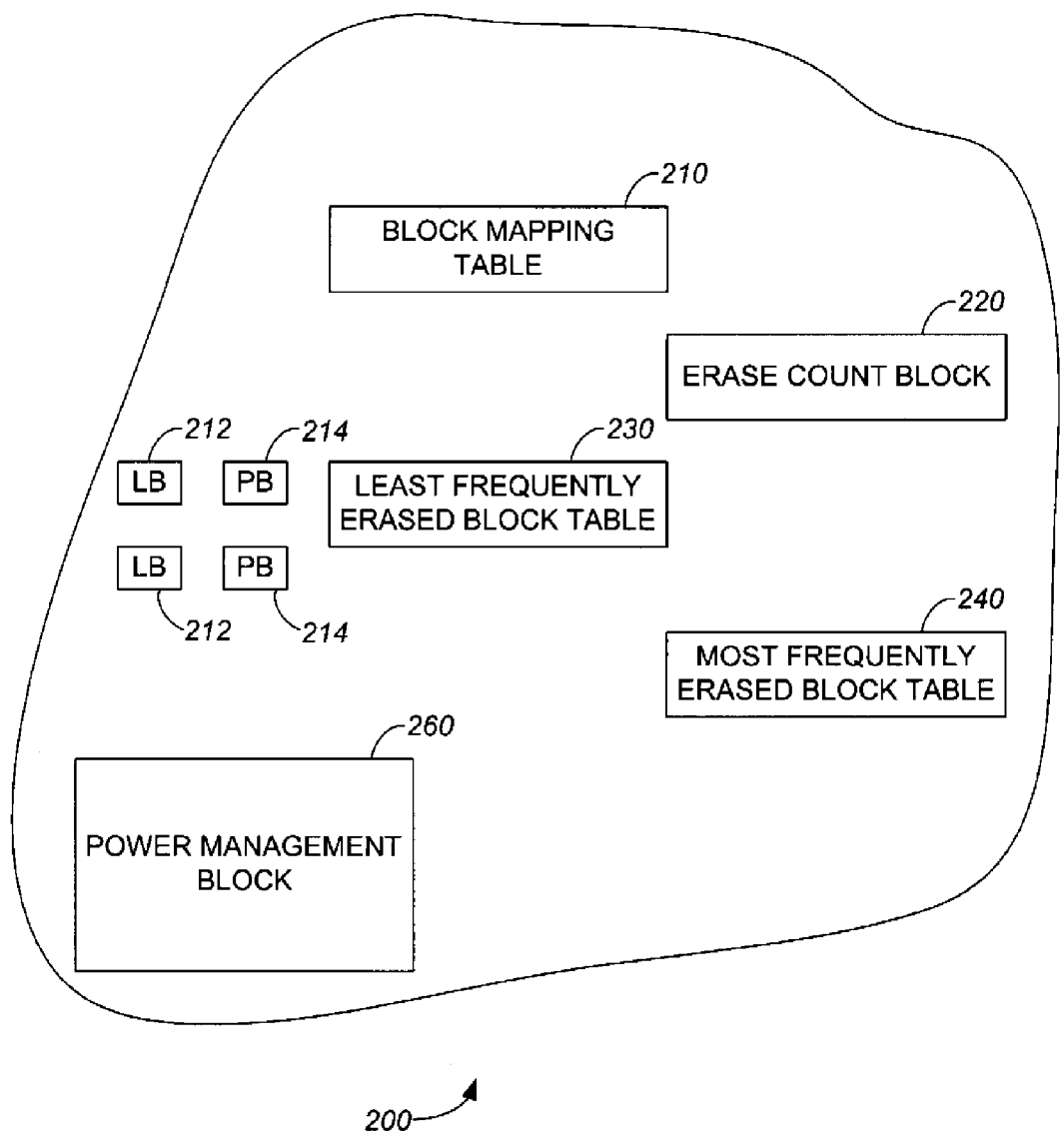
FIG. 2 is a diagrammatic block representation of a system within which internal maintenance requests may be scheduled in accordance with an embodiment of the present invention.

When host system 150 cooperates with non-volatile memory 174, or when a host system 100 of FIG. 1a cooperates with a memory device 120, internal maintenance requests may be scheduled to substantially update and effectively backup some information stored within a non-volatile memory. FIG. 2 is a diagrammatic block representation of a system within which internal maintenance requests may be scheduled in accordance with an embodiment of the present invention. A system 200 includes a block mapping table 210 that is arranged to provide mapping between logical blocks 212 and corresponding physical blocks 214. An erase count block 220, which is described in co-pending U.S. patent application Ser. Nos. 10/281,696 and 10/281,626, which have been incorporated by reference, is arranged to store erase counts, or indications of how many write and erase cycles each physical block 214 has been through. A least frequently erased block table 230, which is described in co-pending U.S. patent application Ser. No. 10/281,824 which has been incorporated by reference, is arranged to store information pertaining to available physical blocks 214 which have been through the fewest number of write and erase cycles. Conversely, a most frequently erased block table 240, which is described in co-pending U.S. patent application Ser. No. 10/281,670 which has been incorporated by reference, is arranged to store information pertaining to available physical blocks 214 which have the highest number of write and erase cycles.

Typically, when a normal shut down of system 200 occurs, a power management block 260, which is in a reserved memory area of system 200, is written to. Such a process is described in co-pending U.S. Provisional Patent Application No. 60/422,166, which has been incorporated by reference. Erase counts such as those stored in erase count block 220 may be written into power management block 260 during a normal shutdown. Upon a subsequent power up of system 200, erase counts stored in power management block 260 may be used to substantially recreate erase count block 220, least frequently erased block table 230, and most frequently erased block table 240.

Maintaining current information in erase count block 220, least frequently erased block table 230, and most frequently erased block table 240 enables system 200 to be brought to a relatively current, and accurate, state when a power up occurs after a power down. In order to ensure that information stored in erase count block 220, least frequently erased block table 230, and most frequently erased block table 240 is relatively current, relatively regularly scheduled maintenance of erase count block 220, least frequently erased block table 230, and most frequently erased block table 240 may be performed. That is, erase count block 220, least frequently erased block table 230, and most frequently erased block table 240 may be periodically updated during a scheduled maintenance. In one embodiment, updating erase count block 220 during a scheduled maintenance may include switching erase counts stored in erase count block 220 and in physical blocks 214 from actual erase counts to differential erase counts, or erase counts based on a base value which may be the lowest actual erase count associated with system 200, if appropriate. Differential erase counts are described in co-pending U.S. patent application Ser. No. 10/696,228, which has been incorporated by reference. If differential erase counts are already stored in erase count block 220 when a scheduled maintenance occurs, then updating erase count block 220 may include substantially re-zeroing the differential erase counts, as for example by resetting the vase value on which the differential erase counts are based, as appropriate.

Since updating erase count block 220, least frequently erased block table 230, and most frequently erased block table 240 may be relatively time consuming, erase count block 220, least frequently erased block table 230, and most frequently erased block table are generally when system 200 is powered down or powered up, and during periodic scheduled maintenance. Erase count block 220 may generally be updated more frequently, i.e., erase count block 220 may be rebuilt more frequently, during an adaptive table backup process. It should be appreciated that given an updated erase count block 220, which may be updated by reading substantially all blocks 214 to identify erase counts, it may be possible to rebuild least frequently erased block table 230 and most frequently erased block table 240 if necessary.

In one embodiment, scheduled maintenance may occur whenever least frequently erased block table 230 has been changed approximately one hundred thousand times since the last time erase count block 220, least frequently erased block table 230, and most frequently erased block table 240 were updated, while an adaptive table backup process may occur approximately once for each ten thousand times least frequently erased block table 230 has been changed. Alternatively, scheduled maintenance may occur at a particular time or after a particular amount of time has elapsed, while an adaptive table backup process may also occur at a given time or after a given amount of time has elapsed, with the adaptive table backup process occurring more often than scheduled maintenance.

Figure 3:
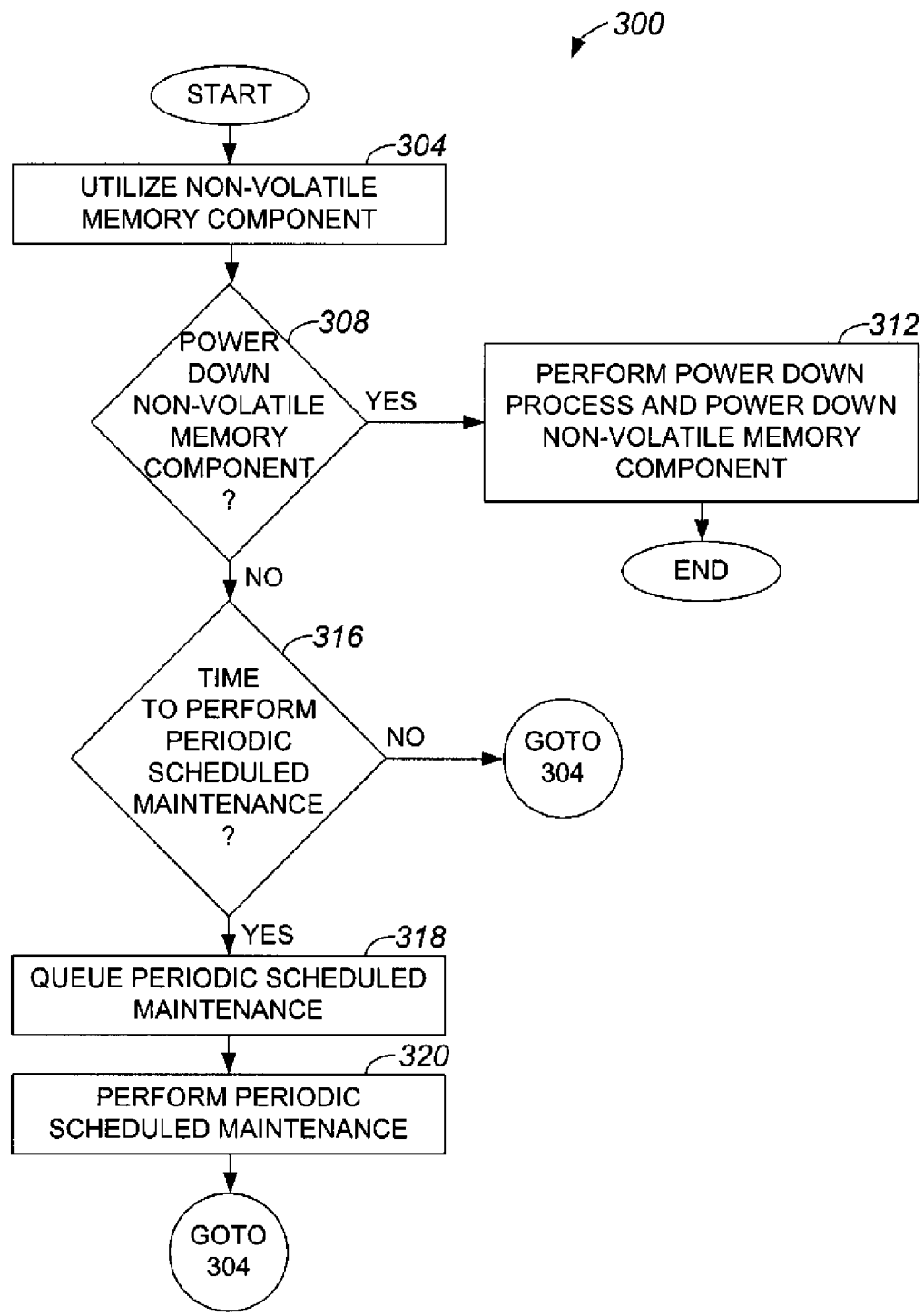
FIG. 3 is a process flow diagram which illustrates one method of using a non-volatile memory component which allows for scheduled maintenance requests in accordance with an embodiment of the present invention.

With reference to FIG. 3, one method of using a non-volatile memory component which allows for internal scheduled maintenance requests will be described in accordance with an embodiment of the present invention. A process 300 of using a non-volatile memory component which allows for scheduled maintenance requests begins at step 304 in which the memory component is utilized, as for example to read and write data. A determination is made in step 308 as to whether the memory component is to be powered down. It should be appreciated that during the course of using the memory component, a user may wish to power down the memory component.

If it is determined in step 308 that the memory component is to be powered down, then process flow moves to step 312 in which a power down process is performed, and the memory component is powered down. A power down process may involve writing signatures into a power management block as described in co-pending U.S. patent application Ser. No. 60/422,166. A power down process may also involve substantially backing up tables, e.g., a block mapping table or a least frequently erased block table, by writing information pertaining to the tables within the power management block such that the tables may be relatively easily recreated or rebuilt upon a subsequent power up process. Once the memory component is powered down, the process of using the non-volatile memory component is completed.

Alternatively, if it is determined in step 308 that the non-volatile memory component is not to be powered down, it is determined in step 316 whether a periodic scheduled maintenance is to be performed, i.e., whether an internal maintenance should be scheduled. As discussed above, an internal maintenance may include substantially bringing an erase count block up to date, and substantially ensuring that a most frequently erased block and a least frequently erased block contain the most frequently erased unused blocks and the least frequently erased unused blocks, respectively, associated with the memory component.

A determination of when to schedule maintenance may be based upon a particular time. By way of example, when a time associated with an overall system associated with the non-volatile memory component is a particular time such as midnight, maintenance may be scheduled. The maintenance may be scheduled using a command such as a deferred procedure call that enables a procedure, e.g., the updating of an erase count block or the updating of a least frequently erased block table, to be scheduled to be called and executed. The use of a deferred procedure call may allow the deferred procedure to be assigned a relatively low priority such that the deferred procedure is substantially only executed after procedures with higher priorities are completed.

If it is determined in step 316 that it is not time to perform scheduled maintenance, then process flow returns to step 304 in which the non-volatile memory component continues to be utilized. Alternatively, if it is determined in step 316 that it is time to perform scheduled maintenance, then the maintenance is scheduled in step 318. In other words, maintenance procedures are queued. Once the maintenance procedures a queued, the maintenance is eventually performed in step 320. The steps associated with one method of performing maintenance will be described below with reference to FIG. 4. After the maintenance procedures are performed, process flow returns to step 304 in which the non-volatile memory component continues to be utilized.

Figure 4:
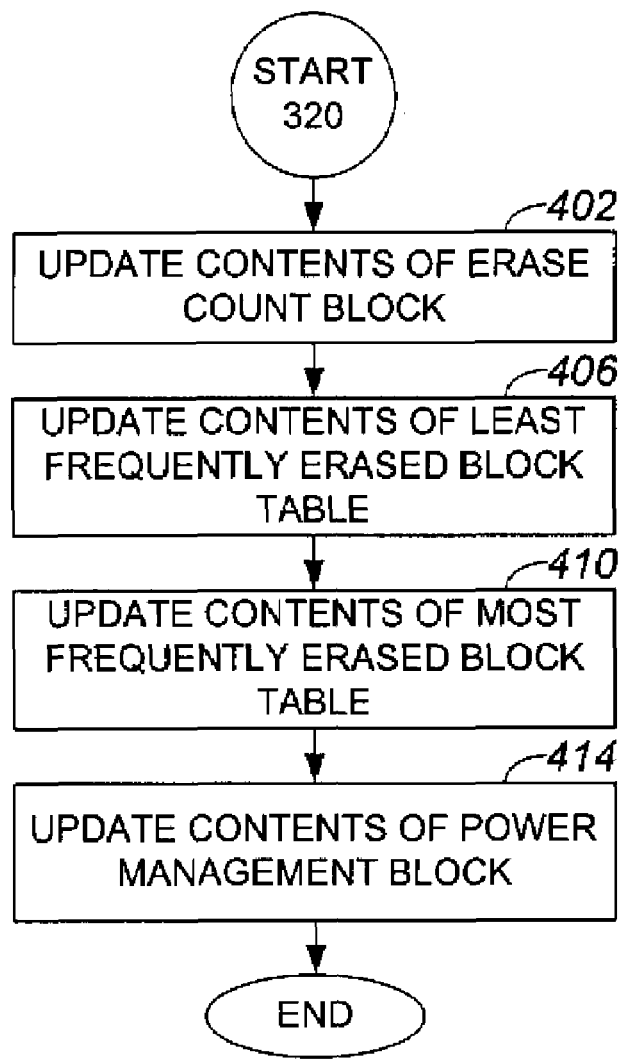
FIG. 4 is a process flow diagram which illustrates one process of performing scheduled internal maintenance, e.g., step 320 of FIG. 3, in accordance with an embodiment of the present invention.

Substantially any maintenance procedure may generally be scheduled when internal maintenance is scheduled. Hence, the procedures performed during schedule maintenance may vary widely. Typically, the procedures are arranged to updating and substantially backing up enough information to enable data structures such as an erase count block, a least frequently erased block table, and a most frequently erased block table to be substantially rebuilt if necessary. A maintenance procedure may also include updating differential erase counts, when differential erase counts are either stored in an erase count block or are to be stored in an erase count block, by substantially zeroing the differential erase counts to a base, e.g., a new base, value. With reference to FIG. 4, the steps associated with one process of performing scheduled internal maintenance, e.g., step 320 of FIG. 3, with be described in accordance with an embodiment of the present invention. Performing scheduled maintenance begins at step 402 in which the contents of an erase count block are updated. Updating the contents of the erase count block may generally include obtaining current erase counts from each usable block included in a non-volatile memory component, using the current erase counts to determine an average erase count, and storing the current erase counts and the average erase count in the erase count block.

After the contents of the erase count block are updated, the contents of a least frequently erased block table are updated in step 406. Updating the contents of a least frequently erased block table may include identifying the current least frequently erased blocks associated with the non-volatile memory component using the updated erase count block, then storing information which identifies those least frequently erased blocks in the least frequently erased block table. As such, a spare block pool which includes the least frequently erased blocks in the non-volatile memory component is effectively updated.

In step 410, a most frequently erased block table is updated to include the current most frequently erased blocks in the non-volatile memory component. The identification of the most frequently erased blocks may be made by identifying the blocks which correspond to the highest erase counts stored in the erase count block. Once the most frequently erased block table is updated, the contents of a power management block are updated in step 414. Updating the contents of a power management block may include writing an average erase count, as well as erase counts associated with usable blocks within the non-volatile memory component, into a page of the power management block. In one embodiment, updating the contents of the power management block also includes writing a signature which may be similar to a shut down signature, which is described in co-pending U.S. Patent Provisional Application No. 60/422,166. A signature may be written to indicate when an erase count block, a least frequently erased block table, and a most frequently erased block table were last updated. Other information which may be written into the power management block includes information pertaining to the erase count block, the blocks identified in the least frequently erased block table, and the blocks identified in the most frequently erased block table. Hence, an erase count block, a least frequently erased block table, and a most frequently erased block table may effectively be backed up in the power management block when the power management block holds enough information to recreate such blocks or tables or at least to point to the locations in memory in which the blocks or tables are located. After the power management block is updated, the process of performing internal maintenance is completed.

Figure 5:
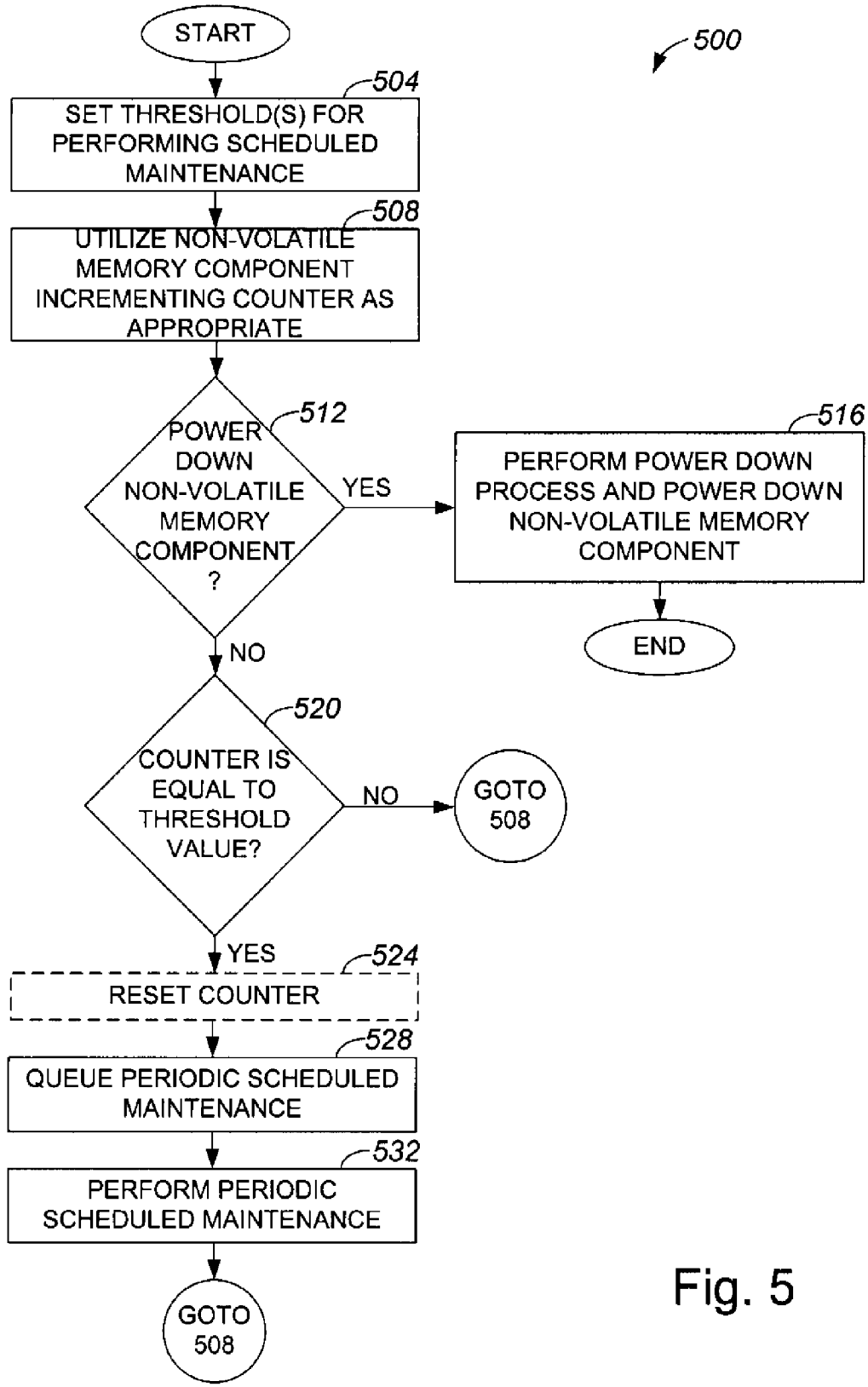
FIG. 5 is a process flow diagram which illustrates one method of operating an overall system within which a driver associated with a memory component may schedule internal maintenance requests in accordance with an embodiment of the present invention.

While the scheduling of internal maintenance requests may be performed by an overall system, e.g., by an application running on a host operating system or by the host operating system itself, the scheduling of internal maintenance requests may also be performed by a driver associated with the overall system. By way of example, when a non-volatile memory is part of a memory component that is interfaced with a host, either the host operating system or an application running on the host interface system may schedule the internal maintenance requests or a driver associated with the memory component may schedule the internal maintenance requests. Referring next to FIG. 5, one method of operating an overall system within which a driver associated with a memory component may schedule internal maintenance requests will be described in accordance with an embodiment of the present invention. A process 500 of operating an overall system begins at step 504 in which a threshold or thresholds for performing schedule maintenance are set. A threshold or thresholds may be based upon a number of times a least frequently erased block table changes or is updated. By way of example, thresholds may be set such that approximately every one hundred thousand times a table such as a least frequently erased block table changes, a threshold is substantially met.

Once the threshold or thresholds are set, the non-volatile memory component is operated and a counter is incremented as appropriate in step 508. When thresholds are based on a number of times a least frequently erased block table changes, the counter may be incremented substantially every time the contents of the least frequently erased block table are changed, i.e., the counter may be a number of times the blocks identified in the least frequently erased block table are changed. The least frequently erased block table is effectively changed each time a block identified in the least frequently erased block table is obtained for use. During the course of operating the non-volatile memory component, it may be determined in step 512 whether the non-volatile memory component is to be powered down. If it is determined that the non-volatile memory component is to be powered down, then a power down process is performed and the non-volatile memory component is powered down in step 516. The power down process may involve updating an erase count block, a least frequently erased block table, and a most frequently erased block table, as well as writing a power down signature. After the non-volatile memory component is powered down, the process of operating the overall system is completed.

Alternatively, if it is determined in step 512 that the non-volatile memory component is not to be powered down, the process flow proceeds to step 520 in which it is determined if the counter is equal to a threshold value. That is, it is determined in step 520 whether a maintenance request is to be scheduled. If it is determined that the counter is not equal to a threshold value, process flow returns to step 508 in which the non-volatile memory component continues to be used, and the counter is incremented as appropriate.

On the other hand, if it is determined in step 520 that the counter is substantially equal to a threshold value, then in one embodiment, the counter is reset in step 524. When there is one threshold value, the counter may be reset such that each time the reinitialized counter is eventually incremented to the extent that the counter is substantially equal to the threshold value, maintenance may be scheduled. It should be appreciated, however, when there is more than one threshold value, the counter is not necessarily reset, since there are multiple threshold values which may be reached by the counter to indicate when a maintenance is to be scheduled.

In step 528, maintenance is scheduled, e.g., procedures associated with updating the contents of various blocks and tables may be scheduled. Typically, maintenance procedures are queued using deferred procedure calls which allow higher priority procedures to be performed and completed before the maintenance procedures are performed. After maintenance is scheduled, periodic maintenance is performed in step 532. That is, the scheduled maintenance after substantially all higher priority procedures in a queue of procedures is completed and the overall system is effectively idle. The steps associated with one method of performing periodic scheduled maintenance were described above with reference to FIG. 4. Once the scheduled maintenance is performed, process flow returns to step 508 in which the non-volatile memory component continues to be utilized.

As discussed above, scheduling internal maintenance enables a process which allows an erase count block to be substantially brought up-to-date to include the most current erase counts associated with blocks of a memory component to be scheduled such that the maintenance may occur when system resources are relatively available. Scheduling internal maintenance also allows processes to update other blocks and tables such as a least frequently erased block table, a most frequently erased block table, and a power management block.

Figure 6A:
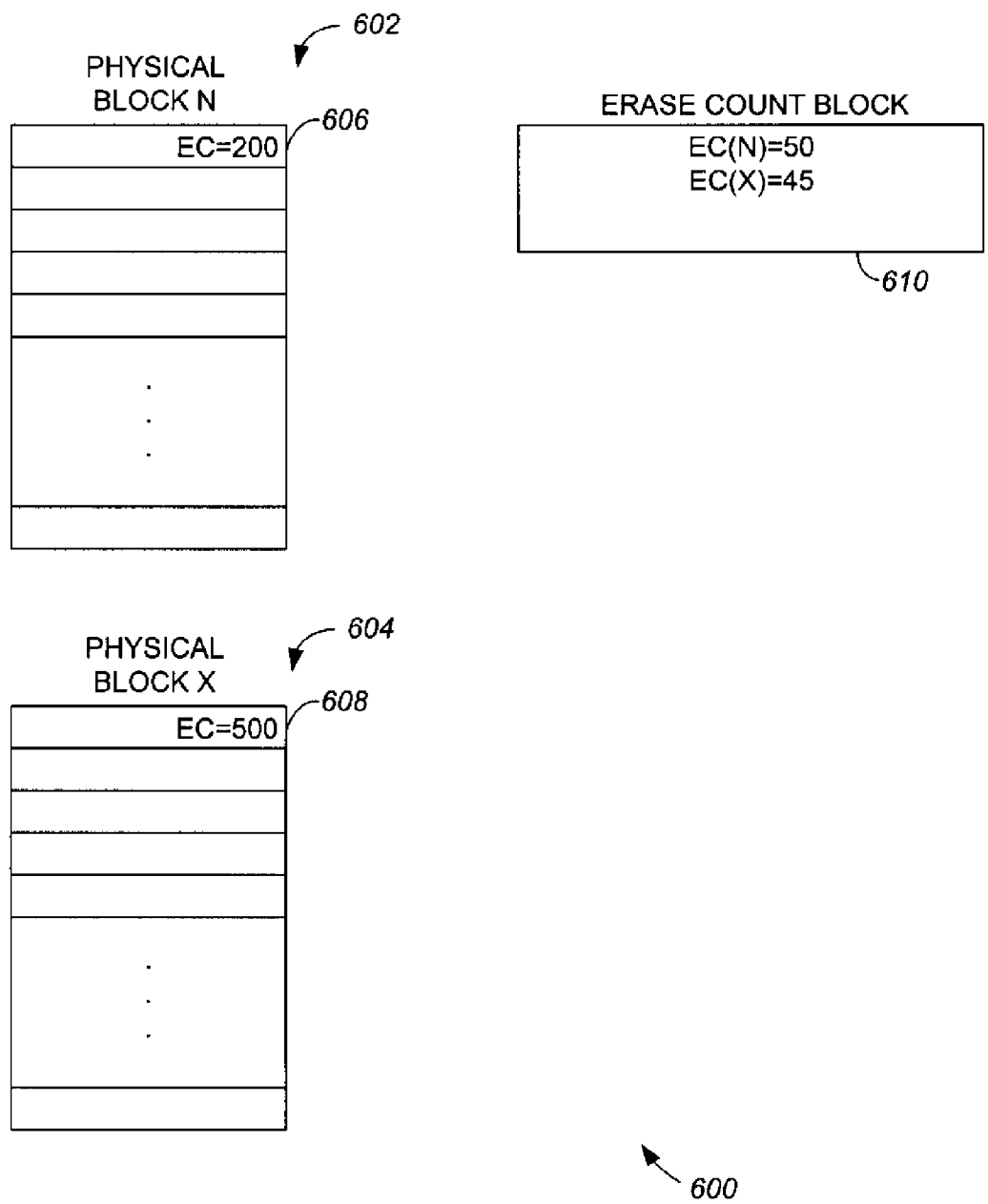
FIG. 6a is a diagrammatic representation of physical blocks and an erase count block prior to being updated in accordance with an embodiment of the present invention.

FIG. 6a is a diagrammatic representation of physical blocks and an erase count block prior to being updated. Within a system 600, spare physical blocks 602, 604 which are arranged to store data may have associated erase counts 606, 608, respectively, stored therein. Block 602 has an erase count 606 which indicates that block 602 has been erased two hundred times, while block 604 has an erase count 608 which indicates that block 604 has been erased five hundred times.

An erase count block 610 is generally arranged to contain information which includes the erase counts of blocks 602, 604. However, when erase count block 610 has not been updated for a relatively long time, the erase counts stored in erase count block 610 which correspond with blocks 602, 604 may be outdated, as shown. Similarly, when the current least frequently erased blocks within system 600 have not been identified relatively recently, e.g., within the last twenty-four hours, the least frequently erased blocks stored in a least frequently erased block table (not shown) may not be the current least frequently erased blocks within system 600. By way of example, although erase count 608 for block 604 indicates that block 604 has more wear than block 602, block 604 may effectively be identified in least frequently erased block table 612 as being a least frequently erased block while block 602 is not. Hence, although block 602 has less wear than block 604, i.e., although block 602 is less frequently erased than block 604, a least frequently erased block table (not shown) may provide a substantially inaccurate listing of the least frequently erased blocks.

Figure 6B:
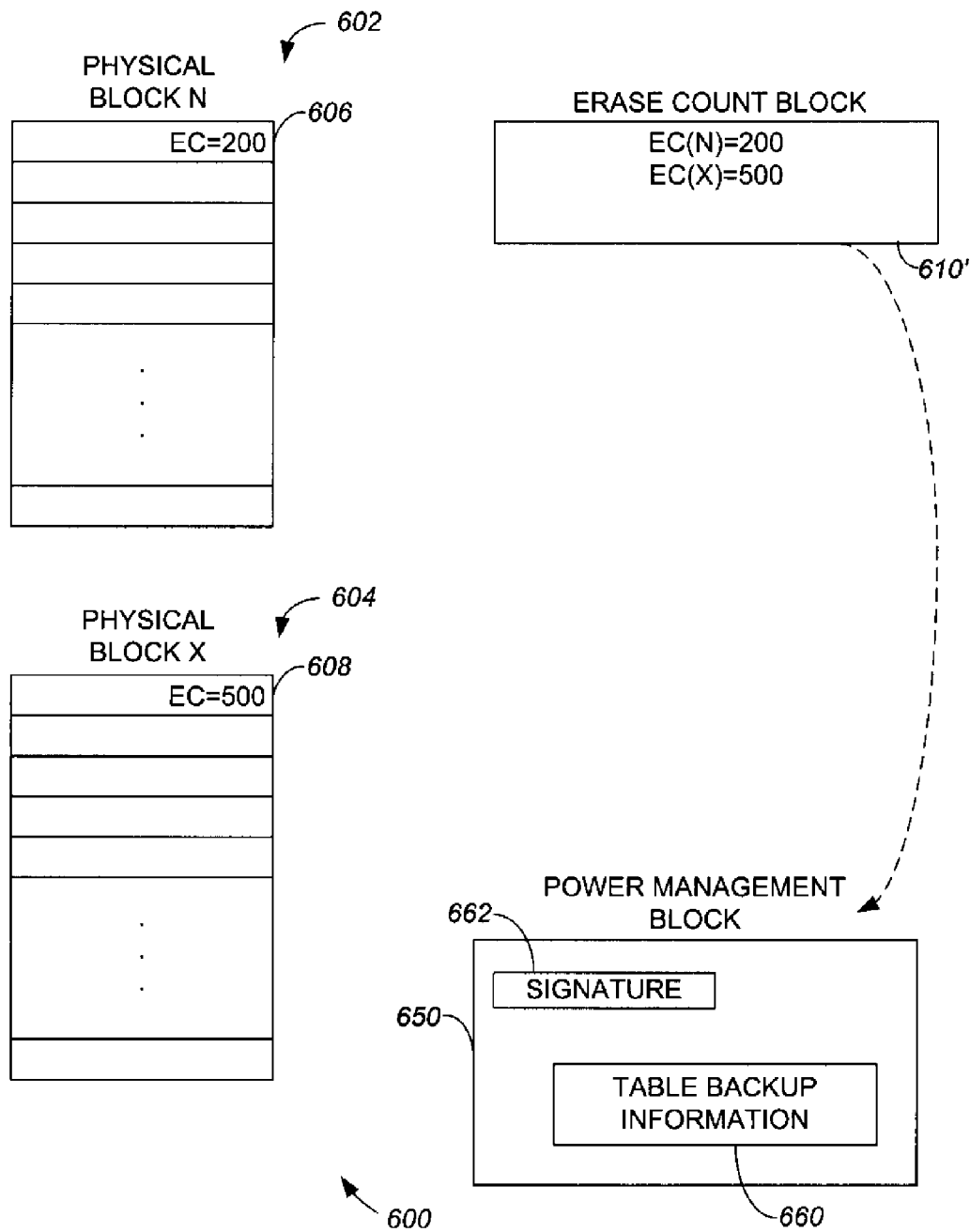
FIG. 6b is a diagrammatic representation of an erase count block, e.g., erase count block 610 of FIG. 6a, after a scheduled update has occurred in accordance with an embodiment of the present invention.

In order to increase the likelihood that erase counts stored in erase count block 610 are reasonably current, internal maintenance requests may be scheduled to ensure that updates occur relatively regularly. FIG. 6b is a diagrammatic representation of an erase count block, e.g., erase count block 610 of FIG. 6a, after a scheduled update has occurred in accordance with an embodiment of the present invention. Once an scheduled update process is completed, erase count block 610' contains relatively current versions of erase counts associated with blocks 602, 604.

Figure 8:
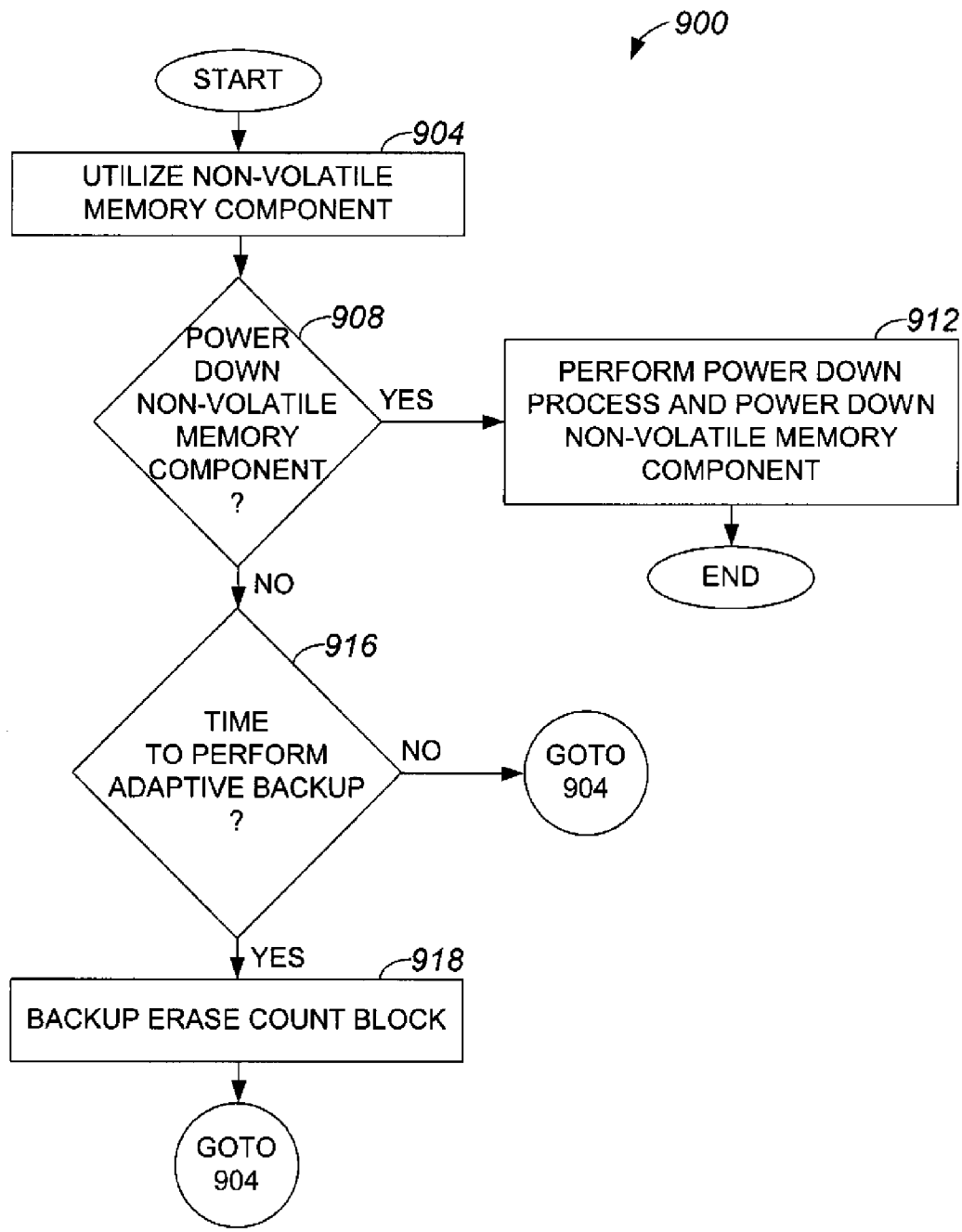
FIG. 8 is a process flow diagram which illustrates one method of using a non-volatile memory component which allows for adaptive table backups in accordance with an embodiment of the present invention.

When it is desired for erase count block 610' to be effectively backed up, then information pertaining to erase count block 610' may be stored into a power management block 650 when a scheduled maintenance is performed, or when an adaptive table backup process, which will be described below with reference to FIG. 8, is performed. In one embodiment, the information stored may be substantially any information which is likely to be needed to enable erase count block 610' to be rebuilt if necessary. For example, information 660 needed to enable erase count block 610' to be recreated may be stored along with a signature 662 such as a power down signature described in co-pending U.S. Provisional Patent Application No. 60/422,166. Such information 660 may include erase counts, as erase counts may be used to substantially recreate erase count block 610', aa least frequently erased block table (not shown), and other tables including, but not limited to, a most frequently erased block table (not shown).

Figure 7:
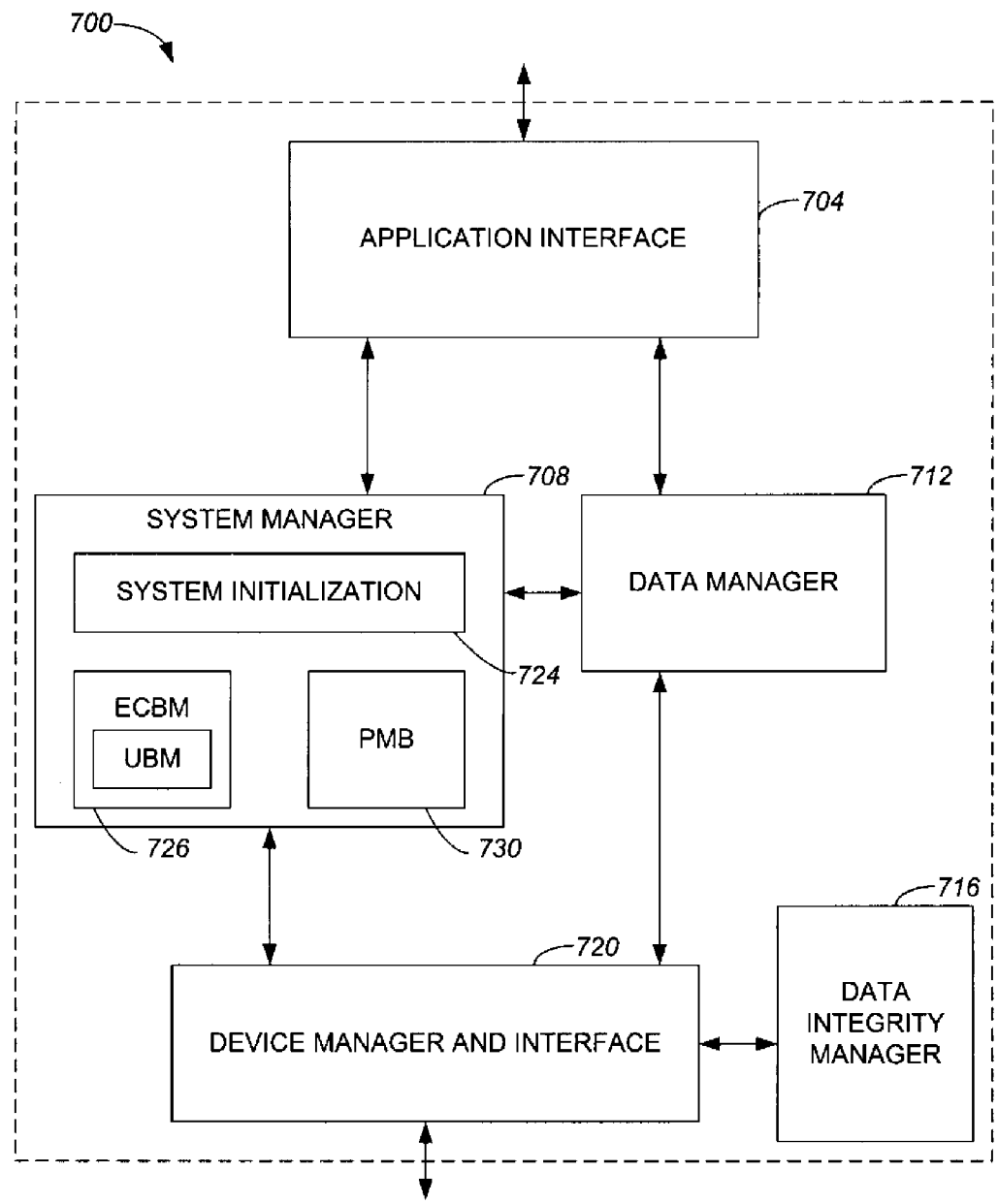
FIG. 7 is a diagrammatic block diagram representation of a system architecture in accordance with an embodiment of the present invention.

In general, the functionality associated with allowing internal maintenance schedule requests is provided in software, e.g., as program code devices, or as firmware to a host system which includes a non-volatile memory or non-volatile memory component. One embodiment of a suitable system architecture associated with the software or firmware provided to a host system to enable a power management block to be implemented, maintained, and used is shown in FIG. 7. A system architecture 700 generally includes a variety of modules which may include, but are not limited to, an application interface module 704, a system manager module 708, a data manager module 712, a data integrity manager 716, and a device manager and interface module 720. In general, system architecture 700 may be implemented using software code devices or firmware which may be accessed by a processor, e.g., processor 108 of FIG. 1*a*.

In general, application interface module 704 may be arranged to communicate with the host, operating system or the user directly. Application interface module 704 is also in communication with system manager module 708 and data manager module 712. When the user want to read, write or format the flash memory, it send requests to the operating system, the requests are passed to the Application interface. The Application interface directs the requests to the system manager module 708 or data manager module 712 depending on the requests.

System manager module 708 includes a system initialization submodule 724, an erase count block management submodule 726, and a power management block submodule 730. System initialization submodule 724 is generally arranged to enable an initialization request to be processed, and typically communicates with erase count block management submodule 726. Erase count block management submodule 726 includes functionality to cause erase counts of blocks to be stored, and functionality to cause an average erase count to be calculated, as well as updated, using individual erase counts. The use of erase counts is described in co-pending U.S. patent application Ser. No. 10/281,739, which is incorporated herein by reference in its entirety. System initialization module 724 is also arranged to resolve a one-to-many logical-to-physical block assignment and, hence, may utilize update indexes. Power management block submodule 730 may be arranged to enable a power management to be implemented, maintained, and used. By way of example, power management block submodule 730 may be arranged to allocate power management blocks, and to oversee the writing of signatures and other information which may be stored in a power management block.

In addition to being in communication with application interface module 704, system manager module 708 is also in communication with data manager module 712, as well as device manager and interface module 720. Data manager module 712, which communicates with both system manager module 708 and application interface module 704, may include functionality to provide sector mapping which effectively translates logical sectors into physical sectors. That is, data manager module 712 is arranged to map logical blocks into physical blocks. Data manager module 712 may also include functionality associated with operating system and file system interface layers, and enables groups within blocks to be managed, as described in co-pending U.S. patent application Ser. No. 10/281,855, which is incorporated herein by reference in its entirety.

Device manager and interface module 720, which is in communication with system manager module 708, data manager 712, and data integrity manager 716, typically provides a flash memory interface, and includes functionality associated with hardware abstractions, e.g., an I/O interface. Data integrity manager module 716 provides ECC handling, among other functions.

As previously mentioned, an adaptive table backup process may be used to enable an erase count block to be backed up and, hence, updated more frequently than the erase count block would be backed up as a result of a scheduled maintenance process. In one embodiment, an adaptive table backup process may be arranged such that an erase count block is not fully updated at one time. In such an embodiment, when it is determined that an adaptive table backup process is to occur, a portion of the erase count block may be updated, e.g., a fourth of the erase count block may be updated. Then, the next time it is determined that an adaptive table backup process is to occur, a different portion of the erase count block may be updated, e.g., the next fourth of the erase count block may be updated. By partially updating the erase count block during each adaptive table backup process, the time associated with each adaptive table backup process may be reduced.

With reference to FIG. 8, one method of using a non-volatile memory component which allows for adaptive table backups will be described in accordance with an embodiment of the present invention. A process 900 of using a non-volatile memory component which allows for adaptive table backups begins at step 904 in which the memory component is utilized. A determination is then made in step 908 as to whether the memory component is to be powered down.

If it is determined in step 908 that the memory component is to be powered down, then process flow moves to step 912 in which a power down process is performed, and the memory component is powered down. As previously mentioned, a power down process may involve writing signatures into a power management block as described in co-pending U.S. patent application Ser. No. 60/422,166. Typically, a power down process will include performing substantially the same steps as performed in an adaptive table backup. Once the memory component is powered down, the process of using the non-volatile memory component is completed.

Alternatively, if the determination in step 908 is that the non-volatile memory component is not to be powered down, a determination is made in step 916 as to whether a an adaptive table backup is to be performed. As discussed above, an adaptive table backup may include substantially bringing an erase count block up to date by rebuilding the erase count block with at least some the most current erase counts obtained from the physical blocks within the non-volatile memory component. The adaptive table backup may also store sufficient information to enable a least frequently erased block table and a most frequently erased block table to be rebuilt, though an adaptive table backup generally does not involve actually rebuilding the least frequently erased block table and the most frequently erased block table.

A determination of whether an adaptive table backup is to be performed may generally be based on a threshold value. By way of example, when the least frequently erased blocks within the system that are identified in a least frequently erased block table are changed a particular number of times since the last time the erase count block was updated, it may be determined that an adaptive table backup is to occur.

If it is determined in step 916 that it is not time to perform an adaptive table backup, then process flow returns to step 904 in which the non-volatile memory component continues to be utilized. Alternatively, if it is determined in step 916 that it is time to perform an adaptive table backup, then the adaptive table backup is performed in step 918 to substantially backup the erase count block. Backing up the erase count block generally includes obtaining current erase counts, updating the current erase counts in the erase count block and, hence, rebuilding the erase count block. It should be appreciated that backing up the erase count block effectively backs up information that may be used to subsequently rebuild a least frequently erased block table and a most frequently erased block table. In the described embodiment, substantially all of the erase counts stored in the erase count block are updated, although other embodiments may instead involve partially updating the erase count block. After the erase count block is backed up, process flow returns to step 904 in which the non-volatile memory component continues to be utilized.

Although only a few embodiments of the present invention have been described, it should be understood that the present invention may be embodied in many other specific forms without departing from the spirit or the scope of the present invention. By way of example, although the ability to schedule an internal maintenance request to update blocks and tables, as well as to substantially backup blocks and tables, has generally been described as being associated with a NAND memory, e.g., an MLC NAND memory. In general, however, a power management block may be implemented with respect to substantially any suitable memory or memory system.

A non-volatile memory system may utilize both scheduled internal maintenance requests and adaptive table backup processes. For example, for approximately every ten thousand changes in the blocks associated with a table such as a least frequently erased block table, an adaptive table backup process may occur, while a scheduled maintenance may occur for approximately every one hundred thousand changes in the blocks associated with the least frequently erased block table. However, some non-volatile memory systems may instead use either only an adaptive table backup process or only scheduled maintenance requests. In addition, it should be understood that the number of changes to blocks in a table such as a least frequently erased block table that effectively "triggers" an adaptive table backup process of a scheduled maintenance may vary widely.

While a table such as a least frequently erased block table or a most frequently erased block table may effectively be written into a power management block to substantially back up the table, it should be appreciated that writing tables into a power management block is optional. For instance, for an embodiment in which a user or a system does not require that tables be backed up, tables may not be written into the power management block.

The frequency with which an internal maintenance request is scheduled may vary widely. In general, when internal maintenance requests are scheduled by a host operating system or an application, an internal maintenance request may be scheduled such that it occurs at a certain time each day, or any time a certain amount of time has elapsed since internal maintenance was performed either due to a scheduled request or due to a normal power down. When internal maintenance requests are scheduled by a memory component itself, an internal maintenance request may also be scheduled such that it occurs at a certain time each day, or any time a certain amount of time has elapsed since a previous internal maintenance was performed. A check of whether it is time for an internal maintenance request to be scheduled may be made, as described above, when a counter reaches a particular value.

In addition to updating tables such as an erase count block, a least frequently erased block table, and a most frequently erased block table, various other procedures may be performed during scheduled internal maintenance. As described above, switching from actual erase counts to differential erase counts, or updating differential erase counts, as appropriate during scheduled internal maintenance are examples of additional procedures which may be performed during scheduled maintenance. Other procedures which may be performed during scheduled maintenance may include, but are not limited to, procedures such as static block swapping. Static block swapping may involve determining when a static block is a physical block with a relatively low erase count, and substantially copying the contents of the static block into a physical block with a relatively high erase count such that the physical block with the relatively low erase count effectively becomes a spare block. The use of static block swapping to promote efficient wear leveling is described in co-pending U.S. patent application Ser. Nos. 10/281,739, 10/281,670, and 10/281,824, which have been incorporated by reference.

The steps associated with the various methods of the present invention may be widely varied. In general, steps may be added, removed, reordered, and altered without departing from the spirit or the scope of the present invention. In one embodiment, when a counter which tracks a number of times a least frequently erased block table is updated is substantially equal to a threshold value, a timer associated with a memory component or an overall system may be checked to determine if it is time to schedule a maintenance request. Therefore, the present examples are to be considered as illustrative and not restrictive, and the invention is not to be limited to the details given herein, but may be modified within the scope of the appended claims.

What is claimed is:

1. A method for operating a memory system, the memory system including a non-volatile memory, the non-volatile memory having a plurality of physical blocks and a plurality of data structures including an erase count block, the erase count block containing a status of each physical block of the plurality of physical blocks, the method comprising:

determining when contents of at least one data structure of the plurality of data structures are to be updated;

queuing a request to update the contents of the at least one data structure when it is determined that the contents of the at least one data structure are to be updated; and executing the request to update the contents of the at least one data structure.

2. The method of claim 1 updating the contents of the at least one data structure includes updating the contents of the erase count block to indicate a substantially current status of each physical block of the plurality of physical blocks.

3. The method of claim 1 wherein the plurality of data structures includes a first data structure arranged to contain information which identifies available physical blocks of the plurality of physical blocks which have been through a relatively low number of write and erase cycles as indicated by the status associated with the available physical blocks, and wherein executing the request to update the contents of the at least one data structure includes updating contents of the first data structure.

4. The method of claim 1 wherein the plurality of data structures includes a first data structure arranged to contain information which identifies available physical blocks of the plurality of physical blocks which have been through a relatively high number of write and erase cycles as indicated by the status associated with the available physical blocks, and wherein executing the request to update the contents of the at least one data structure includes updating contents of the first data structure.

5. The method of claim 1 wherein the plurality of data structures includes a first data structure that is arranged to contain information which is used by the memory system when the memory system is powered up, and wherein executing the request to update the contents of the at least one data structure includes updating contents of the first data structure.

6. The method of claim 5 wherein the first data structure is a power management block.

7. The method of claim 1 wherein queuing the request to update the contents of the at least one data structure includes:
adding the request to a queue of procedures and applications to be executed, the request being assigned a relatively low priority in the queue.

8. The method of claim 7 wherein executing the request to update the contents of the at least one data structure includes executing the request to update the contents of the at least one data structure when the queue is substantially empty except for the request to update the contents of the at least one data structure.

9. The method of claim 1 wherein determining when the contents of the at least one data structure of the plurality of data structures are to be updated includes comparing a first value with a threshold, wherein when the first value is substantially equal to the threshold, it is determined that the contents of the at least one data structure are to be updated.

10. The method of claim 1 wherein determining when the contents of the at least one data structure of the plurality of data structures are to be updated includes obtaining a time associated with the memory system and determining when the time indicates that the contents of the at least one data structure are to be updated.

11. The method of claim 1 wherein the non-volatile memory is a NAND flash memory.

12. A method for operating a memory system, the memory system including a non-volatile memory, the non-volatile memory having a plurality of physical blocks and a plurality of data structures including an erase count block, the erase count block containing an erase count of at least one physical block of the plurality of physical blocks, the erase count being arranged to indicate a number of times the at least one physical block of the plurality of physical blocks has been erased, the method comprising:
determining when an internal maintenance process is to be performed within the memory system, wherein the internal maintenance process is arranged to update the erase count of the at least one physical block of the plurality of physical blocks in the erase count block;
queuing a request for the internal maintenance process when it is determined that the internal maintenance request is to be performed; and
executing the internal maintenance process.

13. The method of claim 12 wherein executing the internal maintenance process includes:
updating the erase count of the at least one physical block in the plurality of physical blocks in the erase count block; and
updating a first data structure of the plurality of data structures, the first data structure being arranged to contain information used when the memory system is powered up, wherein the information includes the erase count of the at least one physical block in the plurality of physical blocks.

14. The method of claim 13 wherein executing the internal maintenance process further includes:
updating contents of a second data structure of the plurality of data structures, the second data structure being arranged to substantially identify a set of physical blocks in the plurality of physical blocks which have relatively low erase counts; and
updating contents of a third data structure of the plurality of data structures, the third data structure being arranged to substantially identify a set of physical blocks in the plurality of physical blocks which have relatively high erase counts.

15. The method of claim 12 wherein determining when the internal maintenance process is to be performed includes comparing a first value with a threshold, wherein when the first value is substantially equal to the threshold, it is determined that the internal maintenance process is to be performed.

16. The method of claim 12 wherein determining when the internal maintenance process is to be performed includes obtaining a time associated with the memory system and determining when the time indicates that the internal maintenance process is to be performed.

17. A memory device comprising:
a non-volatile memory, the non-volatile memory including a plurality of physical blocks and an erase count block that is arranged to store an erase count associated with at least one physical block of the plurality of physical blocks;
code devices that are arranged to determine when an internal maintenance process is to be performed within the memory system, wherein the internal maintenance process is arranged to update the erase count of the at least one physical block of the plurality of physical blocks in the erase count block;
code devices that are arranged to queue a request for the internal maintenance process when it is determined that the internal maintenance request is to be performed;
code devices that are arranged to execute the internal maintenance process; and
a medium that stores the code devices.

18. The memory device of claim 17 wherein the code devices that are arranged to execute the internal maintenance process include:

code devices that are arranged to update the erase count of the at least one physical block in the plurality of physical blocks in the erase count block; and code devices that are arranged to update a first data structure of the plurality of data structures, the first data structure being arranged to contain information used when the memory system is powered up, wherein the information includes the erase count of the at least one physical block in the plurality of physical blocks.

19. The memory device of claim 18 wherein the code devices that are arranged to execute the internal maintenance process further include:

code devices that are arranged to update contents of a second data structure of the plurality of data structures, the second data structure being arranged to substantially identify a set of physical blocks in the plurality of physical blocks which have relatively low erase counts; and code devices that are arranged to update contents of a third data structure of the plurality of data structures, the third data structure being arranged to substantially identify a set of physical blocks in the plurality of physical blocks which have relatively high erase counts.

20. The memory device of claim 17 wherein the code devices that are arranged to determine when the internal maintenance process is to be performed include code devices that are arranged to compare a first value with a threshold, wherein when the first value is substantially equal to the threshold, it is determined that the internal maintenance process is to be performed.

21. The memory device of claim 17 wherein the code devices that are arranged to determine when the internal maintenance process is to be performed include code devices that are arranged to obtain a time associated with the memory system and code devices that are arranged to determine when the time indicates that the internal maintenance process is to be performed.

22. A memory device comprising:

a non-volatile memory, the non-volatile memory including a plurality of physical blocks and an erase count block that is arranged to store an erase count associated with at least one physical block of the plurality of physical blocks;

means for determining when an internal maintenance process is to be performed within the memory system, wherein the internal maintenance process is arranged to update the erase count of the at least one physical block of the plurality of physical blocks in the erase count block;

means for queuing a request for the internal maintenance process when it is determined that the internal maintenance request is to be performed; and means for executing the internal maintenance process.

23. The memory device of claim 22 wherein the means for executing the internal maintenance process include:

means for updating the erase count of the at least one physical block in the plurality of physical blocks in the erase count block; and means for updating a first data structure of the plurality of data structures, the first data structure being arranged to contain information used when the memory system is powered up, wherein the information includes the erase count of the at least one physical block in the plurality of physical blocks.

24. The memory device of claim 23 wherein the means for executing the internal maintenance process further include:

means for updating contents of a second data structure of the plurality of data structures, the second data structure being arranged to substantially identify a set of physical blocks in the plurality of physical blocks which have relatively low erase counts; and means for updating contents of a third data structure of the plurality of data structures, the third data structure being arranged to substantially identify a set of physical blocks in the plurality of physical blocks which have relatively high erase counts.

25. The memory device of claim 22 wherein the means for determining when the internal maintenance process is to be performed include means for comparing a first value with a threshold, wherein when the first value is substantially equal to the threshold, it is determined that the internal maintenance process is to be performed.

26. The memory device of claim 22 wherein the means for determining when the internal maintenance process is to be performed include means for obtaining a time associated with the memory system and means for determining when the time indicates that the internal maintenance process is to be performed.

* * * * *